(12) United States Patent
Ebert et al.

(10) Patent No.: US 12,344,097 B2
(45) Date of Patent: Jul. 1, 2025

(54) HYBRID DRIVE MODULE FOR A MOTOR VEHICLE

(71) Applicant: ZF FRIEDRICHSHAFEN AG, Friedrichshafen (DE)

(72) Inventors: Angelika Ebert, Schonungen (DE); Monika Rößner, Donnersdorf (DE); Wolfgang Großpietsch, Schweinfurt (DE); Wolfgang Kundermann, Dornburg-Dorndorf (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 795 days.

(21) Appl. No.: 17/046,446

(22) PCT Filed: Mar. 12, 2019

(86) PCT No.: PCT/EP2019/056099
§ 371 (c)(1),
(2) Date: Oct. 9, 2020

(87) PCT Pub. No.: WO2019/197105
PCT Pub. Date: Oct. 17, 2019

(65) Prior Publication Data
US 2021/0146770 A1    May 20, 2021

(30) Foreign Application Priority Data
Apr. 11, 2018 (DE) .................... 10 2018 205 460.6

(51) Int. Cl.
*B60K 6/48* (2007.10)
*B60K 6/387* (2007.10)
(Continued)

(52) U.S. Cl.
CPC ................ *B60K 6/48* (2013.01); *B60K 6/387* (2013.01); *B60K 6/40* (2013.01); *F16D 13/42* (2013.01); *B60K 2006/4825* (2013.01)

(58) Field of Classification Search
CPC ............ B60K 6/48; B60K 6/387; B60K 6/40; B60K 2006/4825; F16D 13/42; F16D 25/0638; Y02T 10/62
See application file for complete search history.

(56) References Cited

U.S. PATENT DOCUMENTS 6,258,001 B1 * 7/2001 Wakuta .................... B60K 6/48
                                                                903/952
6,508,348 B2 * 1/2003 Sugano .................. B60K 6/543
                                                                903/952
(Continued)

FOREIGN PATENT DOCUMENTS

| CN | 104553734 A | * | 4/2015 | ............... B60K 6/26 |
| CN | 108138864 A | * | 6/2018 | ............... F16C 19/36 |

(Continued)

OTHER PUBLICATIONS

Translated copy of JP-2006298272-A (Year: 2023).*
(Continued)

*Primary Examiner* — James A Shriver, II
*Assistant Examiner* — Ian Bryce Shelton
(74) *Attorney, Agent, or Firm* — COZEN O'CONNOR

(57) ABSTRACT

A hybrid drive module for a motor vehicle having a housing, an electric machine with a rotatable rotor and a stator fixed with respect to rotation relative to the housing, and a clutch. A first half of the clutch is connected to a hub, and a second half of the clutch is connected to the rotor. The rotor is rotatably mounted at the hub via a first rolling element bearing. The hub is rotatably mounted via a second rolling element bearing at a bearing shield connected to the housing. A supporting of axial forces on both sides is carried out
(Continued)

between the rotor and hub via the first rolling element bearing and between the hub and bearing shield via the second rolling element bearing. Also disclosed is a motor vehicle powertrain with a hybrid drive module.

21 Claims, 7 Drawing Sheets

(51) Int. Cl.
  *B60K 6/40* (2007.10)
  *F16D 13/42* (2006.01)

(56) References Cited

U.S. PATENT DOCUMENTS

| | | | | |
|---|---|---|---|---|
| 10,843,557 B2* | 11/2020 | Reimnitz | ............... | B60K 6/48 |
| 2001/0024995 A1* | 9/2001 | Sugano | ............... | B60K 6/543 |
| | | | | 903/952 |
| 2010/0288597 A1* | 11/2010 | Kuwahara | ............ | F16D 25/083 |
| | | | | 192/85.61 |
| 2011/0239818 A1* | 10/2011 | Kasuya | ............... | F16D 25/123 |
| | | | | 903/902 |
| 2012/0242199 A1* | 9/2012 | Iwase | ................ | B60L 50/16 |
| | | | | 310/68 B |
| 2013/0213043 A1* | 8/2013 | Kasuya | ................ | B60K 6/48 |
| | | | | 60/700 |
| 2013/0324361 A1* | 12/2013 | Kamiyama | ............ | B60K 6/40 |
| | | | | 903/902 |
| 2014/0230423 A1* | 8/2014 | Iwase | ................ | B60K 6/36 |
| | | | | 903/902 |
| 2015/0114787 A1* | 4/2015 | Brevick | ................ | F16D 13/38 |
| | | | | 192/66.32 |
| 2019/0308496 A1* | 10/2019 | Reimnitz | ............... | F16D 25/10 |
| 2019/0351752 A1* | 11/2019 | Tada | ................ | H02K 7/006 |
| 2020/0039340 A1* | 2/2020 | Keller | ................. | F16D 25/082 |
| 2021/0086605 A1* | 3/2021 | Laigo | ................. | B60K 6/20 |

FOREIGN PATENT DOCUMENTS

| | | | | |
|---|---|---|---|---|
| DE | 102006056512 | | 6/2008 | |
| DE | 102006056512 A1 * | | 6/2008 | ............... B60K 6/26 |
| DE | 102015226522 | | 6/2017 | |
| DE | 102015226522 A1 * | | 6/2017 | ............ B60K 6/387 |
| DE | 102016208830 | | 11/2017 | |
| DE | 102016208830 A1 * | | 11/2017 | ............ B60K 6/365 |
| DE | 102017011873 A1 * | | 5/2018 | |
| EP | 1857700 A1 * | | 11/2007 | ............ B60K 6/387 |
| GB | 2272952 A * | | 6/1994 | ........... F16D 25/085 |
| JP | 2006298272 | | 11/2006 | |
| JP | 2006298272 A * | | 11/2006 | |
| KR | 20180025232 A | | 3/2018 | |
| WO | WO-2013118900 A1 * | | 8/2013 | ............... B60K 6/26 |
| WO | WO-2017170396 A1 * | | 10/2017 | ............ B60K 17/08 |
| WO | WO-2017186226 A1 * | | 11/2017 | ............ B60K 17/02 |

OTHER PUBLICATIONS

Translated copy of DE-102006056512-A1 (Year: 2023).*
Translated copy of JP-2006298272-A (Year: 2024).*
Office Action of the corresponding German Patent Application No. 10 2018 205 460.6.

* cited by examiner

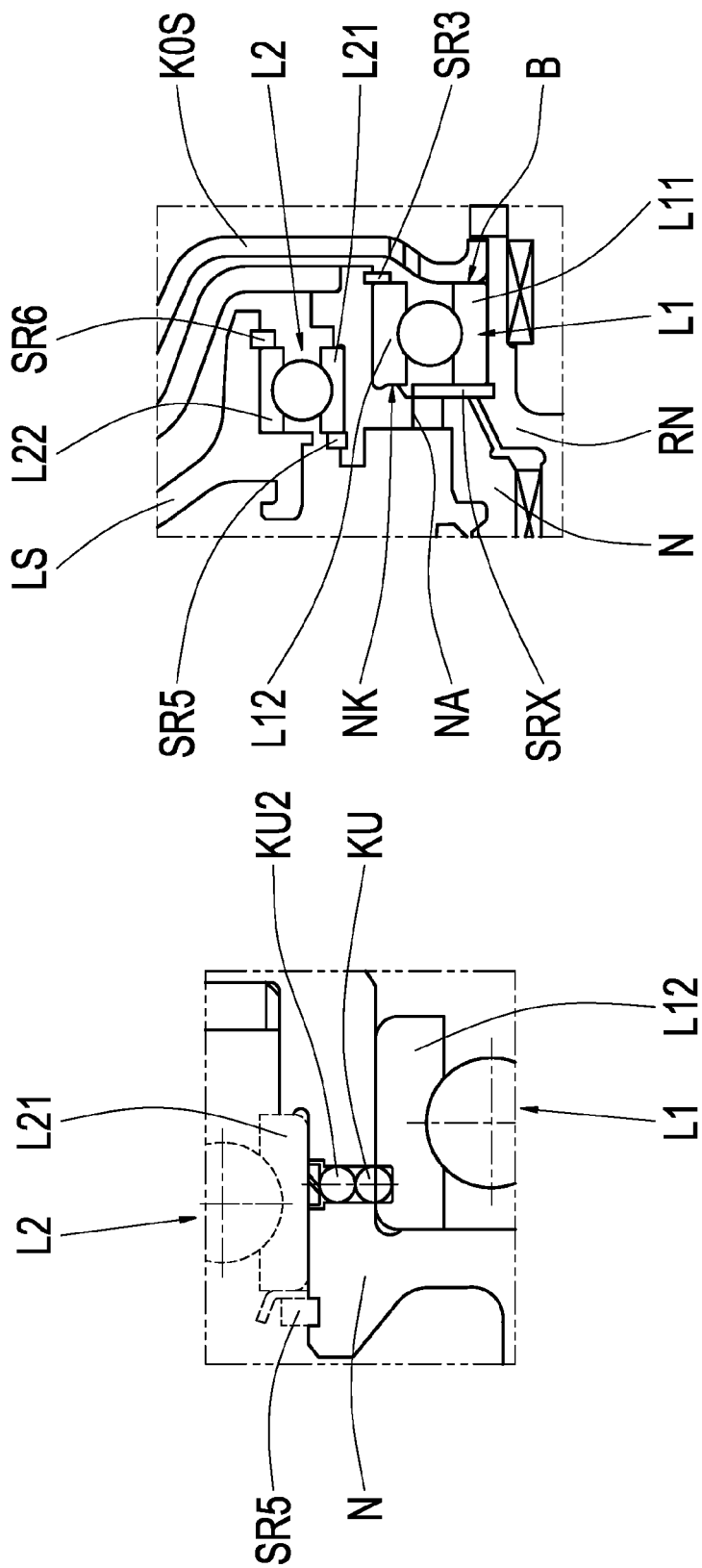
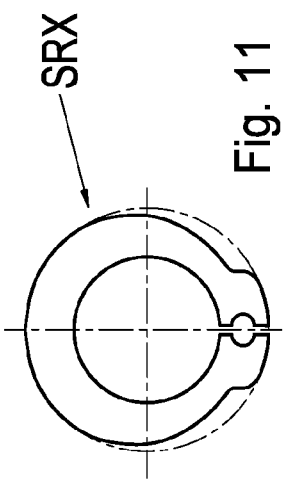
Fig. 9
Fig. 10
Fig. 11

HYBRID DRIVE MODULE FOR A MOTOR VEHICLE

CROSS REFERENCE TO RELATED APPLICATIONS

This is a U.S. national stage of Application No. PCT/EP2019/056099 filed Mar. 12, 2019. Priority is claimed on German Application No. DE 10 2018 205 460.6 filed Apr. 11, 2018 the content of which is incorporated herein by reference.

BACKGROUND OF THE INVENTION

1. Field of the Invention

The invention is directed to a hybrid drive module for a motor vehicle. The hybrid drive module can be an integral component part of a motor vehicle transmission or can be formed as an independent unit with at least one interface to a motor vehicle transmission. The invention is further directed to a powertrain for a motor vehicle with a hybrid drive module of this kind.

2. Description of Related Art

Patent Application US 2013/0086798 A1 describes a hybrid drive module of this kind which has a housing, an electric machine, and a clutch. A stator of the electric machine is arranged opposite the housing so as to be fixed with respect to rotation relative to it. A rotor of the electric machine is rotatably mounted. A first half of the clutch is connected to a hub, and a second half of the clutch is connected to the rotor. A torque-transmitting connection is produced between the two halves of the clutch by engaging the clutch. The rotor is rotatably mounted at the hub via a first rolling element bearing. The hub is rotatably mounted via a second rolling element bearing at a bearing shield which is connected to the housing. The axial bearing support of the rotor is carried out via two needle roller thrust bearings which support the rotor between the hub and a pump housing. The hub is supported at the rotor in axial direction via the second rolling element bearing and via one of the needle roller thrust bearings.

SUMMARY OF THE INVENTION

It is an object of one aspect of the invention to simplify the bearing construction of a hybrid drive module of this kind, particularly to reduce the quantity of bearings.

According to one aspect of the invention, the bearing construction known from the prior art is modified such that a supporting of axial forces on both sides is carried out between the rotor and hub via the first rolling element bearing and between the hub and bearing shield via the second rolling element bearing. Accordingly, at least one needle roller thrust bearing can be dispensed with so that the hybrid drive module can be produced more economically.

The rotor is preferably supported in radial direction at an inner race of the first rolling element bearing such that an outer race of the first rolling element bearing is associated with the hub. To this end, the first rolling element bearing can be constructed, for example, as a deep-groove ball bearing or as an angular contact ball bearing.

According to a preferred embodiment, the transmission of axial force from the rotor to the inner race of the first rolling element bearing is carried out in a first axial force direction via an axial stop of an element which is connected to the rotor so as to be fixed with respect to rotation relative to it or via a first snap ring. In a second axial force direction opposite the first axial force direction, the transmission of axial force is carried out via a second snap ring or via a retaining ring. To facilitate accessibility of the second snap ring, at least one aperture can be provided in the hub to enable access to the second snap ring axially through the hub. To prevent the second snap ring from snapping into the corresponding groove prematurely during assembly of the hybrid drive module, a holding portion for the second snap ring can be provided at the hub.

If an axial stop is used instead of the first snap ring, the element that is connected to the rotor so as to be fixed with respect to rotation relative to it can be a component part of an actuation device of the clutch, for example, an orifice plate in case of a hydraulic actuation of the clutch.

The transmission of axial force from the outer race of the first rolling element bearing to the hub is preferably carried out in the first axial force direction via a contact surface between the hub and outer race and in the second axial force direction via a third snap ring.

The contact surface is preferably arranged axially between the outer race of the first rolling element bearing and the third snap ring. This facilitates accessibility of the third snap ring for assembly and disassembly of the hybrid drive module.

Axially protruding projections are preferably arranged at the outer race of the first rolling element bearing. These projections extend through apertures arranged in the hub. In a construction of this kind, the third snap ring acts between the projections and the hub. Alternatively, a sleeve can be provided that surrounds the outer race of the first rolling element bearing and projects through apertures provided in the hub. In a construction of this kind, the third snap ring acts between the sleeve and the hub. The transmission of axial force in the second axial force direction is carried out via the projections or, alternatively, via the sleeve.

According to a further possible embodiment, the outer race of the first rolling element bearing is axially secured relative to the hub by at least one pin element. The pin element is arranged in a radial bore hole of the hub, and one end of the pin element engages in a groove of the outer race. The pin element preferably comprises an elastic element, which is arranged between two pin portions of the pin element. For example, the elastic element can be an O-ring, an elastomer molded on the pin portions, or a spring. A preloading of the pin portions can be achieved by the elastic element so that the pin element does not fall out during the assembly of the hybrid drive module. Two or three pin elements of this kind are preferably provided for axially securing the outer race of the first rolling element bearing.

According to a further possible embodiment, the outer race of the first rolling element bearing is axially secured relative to the hub by at least one ball arranged in a radial bore hole of the hub. The ball cooperates in positive engagement with the outer race, for example, with a notch at the outer circumference of the outer race. The at least one ball can be secured against falling out by an O-ring. To this end, the O-ring is arranged at an outer diameter of the hub and reduces an opening cross section of the radial bore hole in the assembled state. Two or three balls of this kind are preferably provided for axially securing the outer race of the first rolling element bearing.

In addition to the at least one ball, a further ball can be arranged in the same radial bore hole. The at least one ball is arranged on the radially inner side and the further ball is arranged on the radially outer side in the radial bore hole. Accordingly, smaller balls can be used with the thickness of the hub remaining the same, so that the positive engagement between the radially inner ball and the outer race of the first rolling element bearing is improved. Elements for securing the balls against loss can be provided, for example, by a slit ring arranged at the radially outer opening of the radial bore hole. The ring can be fashioned from steel or plastic. Alternatively, the balls could be pressed into the radial bore hole so that separate loss prevention means can be dispensed with. Three radial bore holes are preferably provided in the hub, and two balls are arranged in these radial bore holes in each instance. The three radial bore holes are preferably uniformly distributed along the circumference of the hub.

According to a further possible embodiment, the outer race of the first rolling element bearing is pressed into the hub. In a solution of this kind, an individual radial bore hole can suffice for axially securing the first rolling element bearing particularly in applications with low axial loading. This embodiment is possible when the axial securing is carried out by a pin element as well as when axial securing is carried out by a ball or balls.

According to a preferred embodiment, the hub is supported at an inner race of the second rolling element bearing so that an outer race of the second rolling element bearing is associated with the bearing shield. In so doing, the transmission of axial force from the hub to the inner race of the second rolling element bearing in the first axial force direction is preferably carried out via a stop at the hub or via a fourth snap ring. In the second axial force direction, the transmission of axial force is carried out via a fifth snap ring. The transmission of axial force from the outer race of the second rolling element bearing to the bearing shield is preferably carried out in the first axial force direction via a stop at the bearing shield and in the second axial force direction via a sixth snap ring.

In order to prevent the sixth snap ring from snapping into the corresponding groove prematurely during assembly of the hybrid drive module, an added element can be provided that holds the sixth snap ring in its spread apart position.

The added element can be a washer. The added element is preferably displaced during the assembly process so that the sixth snap ring snaps into the corresponding groove without an additional process step. The added element can subsequently remain in the hybrid drive module without effect.

A radial shaft sealing ring is preferably provided between the bearing shield and the hub. This radial shaft sealing ring blocks access to the third snap ring and fifth snap ring. The radial shaft sealing ring can be fitted to a sealing sleeve to keep its radial dimensioning small and simultaneously ensure good accessibility to the third snap ring and fifth snap ring.

The hub can be formed of one or more parts. When formed of a plurality of parts, the individual component parts of the hub are connected to one another so as to be fixed with respect to relative rotation, for example, by a positive engagement connection, frictional engagement connection or material bond.

The designation of the snap rings as first snap ring, second snap ring, and so forth, serves merely to clearly distinguish between the snap rings. This designation is not indicative of the quantity of snap rings utilized in the bearing arrangement of the rotor and hub. For example, the bearing arrangement of the hybrid drive module may only have four snap rings although it comprises a "sixth" snap ring according to the preceding description.

The hybrid drive module is preferably an integral component part of a motor vehicle transmission. The one-part or multiple-part housing of the hybrid drive module accommodates planetary gear sets and shifting elements, for example, by which a plurality of gears are shiftable between an input shaft and an output shaft of the transmission. Instead of planetary gear sets and shifting elements, the transmission may also comprise a friction drive with displaceable wheels by which the transmission ratio between the input shaft and output shaft is continuously variable. The transmission can also be constructed as a single-clutch or dual-clutch transmission which utilizes switchable pairs of spur gears for shifting.

Alternatively, the hybrid drive module may be formed as an independent unit with an interface to a motor vehicle transmission. The hybrid drive module is separable from the transmission in this case.

The hybrid drive module can be a component part of a powertrain of a motor vehicle. The electric machine of the hybrid drive module can be provided for driving the motor vehicle and/or for starting an internal combustion engine of the powertrain.

BRIEF DESCRIPTION OF THE DRAWINGS

Embodiment examples of the invention are described in detail in the following referring to the accompanying drawings. The drawings show:

FIG. 2 to FIG. 10 are detailed views of a bearing arrangement of the hybrid drive module;

FIG. 11 is a retaining ring; and

DETAILED DESCRIPTION OF THE PRESENTLY PREFERRED EMBODIMENTS

Figure 1:
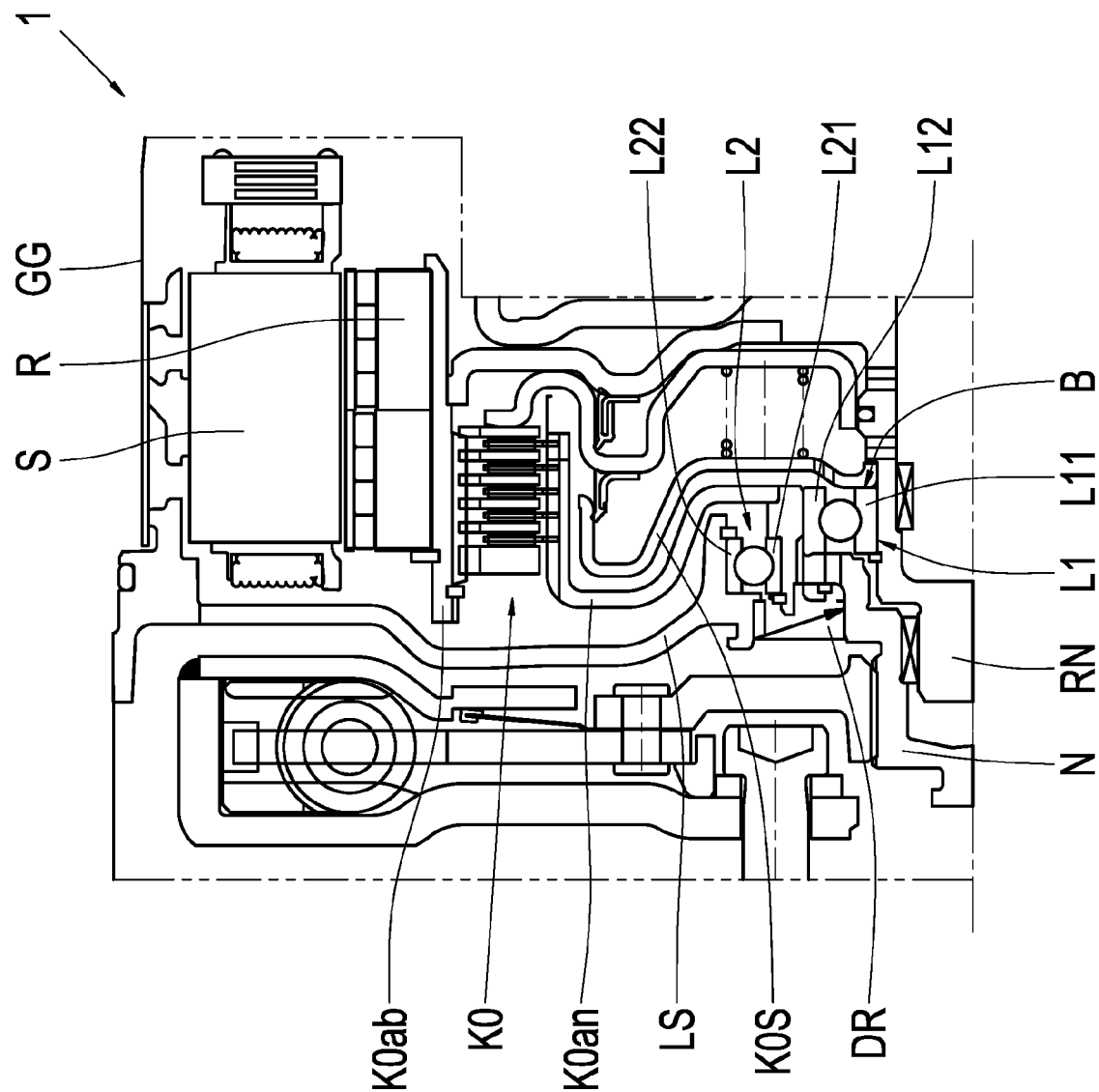
FIG. 1 is a sectional view of an embodiment example of a hybrid drive module according to the invention.

FIG. 1 shows a sectional view of a first embodiment example of the hybrid drive module 1 for a motor vehicle powertrain. The hybrid drive module 1 has a housing GG, an electric machine with a stator S which is fixed with respect to relative rotation, a rotatable rotor R and a clutch K0 formed as a hydraulically actuated multiple plate clutch. An inner plate carrier of the clutch K0 is a component part of a first half K0*an* of clutch K0 and is connected to a hub N so as to be fixed with respect to rotation relative to it. An outer plate carrier of the clutch K0 is a component part of a second half K0*ab* of the clutch K0. The rotor R is connected to the outer plate carrier and to a rotor hub RN so as to be fixed with respect to rotation relative to the latter.

The rotor hub RN serves to rotatably support the rotor R at the hub N. A first rolling element bearing L1 is arranged between the rotor hub RN and the hub N. Hub N is rotatably supported at a bearing shield LS via a second rolling element bearing L2, and the bearing shield LS is fixedly connected to the housing GG. The bearing shield LS separates a wet zone of the hybrid drive module 1 from a dry zone of the hybrid drive module 1. The electric machine, the clutch K0 and the two rolling element bearings L1, L2 are arranged in the wet zone. A portion of the hub N and a torsional vibration damper are arranged in the dry zone. A sealing between the wet zone and dry zone is made possible by a radial shaft sealing ring DR, which seals a radial gap between the bearing shield LS and the hub N.

The two rolling element bearings L1, L2 are constructed, for example, as single-row deep-groove ball bearings and are accordingly configured to support radially acting and axially acting forces. The first rolling element bearing L1 has an inner race L11 and an outer race L12, and a plurality of spherical rolling elements are arranged between the inner race L11 and the outer race L12. The inner race L11 is at a circumferential surface of the rotor hub RN, while the outer race L12 is at an inner surface of hub N. The second rolling element bearing L2 has an inner race L21 and an outer race L22, and a plurality of spherical rolling elements are arranged between inner race L21 and outer race L22. The inner race L21 resides at a circumferential surface of hub N, while the outer race L22 resides at an inner surface of the bearing shield LS. If an axially acting force is to be transmitted via one of the rolling element bearings L1, L2, a corresponding axial support must be ensured between the participating bearing races L11, L12, L21, L22 and the corresponding component parts RN, N, LS. This is shown in more detail in FIGS. 2 to 5 for the sake of clarity.

Figure 2:
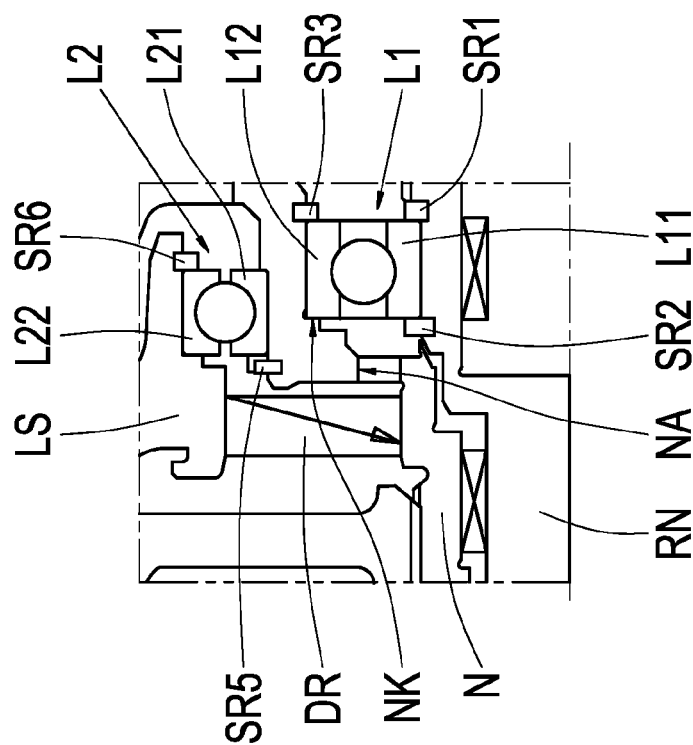

FIG. 2 shows a detailed view of the bearing arrangement of the hybrid drive module 1 according to a second embodiment example. A transmission of axial force from the rotor hub RN to the inner race L11 is effected in a first axial force direction via a first snap ring SR1. The first axial force direction is effective toward the left in the drawing. This embodiment example differs from the arrangement of the hybrid drive module in FIG. 1, where an axial stop B is provided instead of the snap ring. The axial stop B is formed by an orifice plate of the hydraulic actuation device of clutch K0.

In a second axial force direction opposite the first axial force direction, the transmission of axial force from the rotor hub RN to the inner race L11 is effective via a second snap ring SR2. To improve the accessibility of the second snap ring SR2 for assembly and disassembly of the hybrid drive module 1, at least one aperture NA is provided in the hub N. Through the aperture NA, the second snap ring SR2 can be spread apart proceeding from the dry zone provided the radial shaft sealing ring DR has not been assembled.

A transmission of axial force from the outer race L12 to the hub N is effected in the first axial force direction via a contact surface NK between hub N and outer race L12. In the second axial force direction, the transmission of axial force from the outer race L12 to the hub N is effected via a third snap ring SR3. A transmission of axial force from hub N to inner race L21 is effected in the first axial force direction via a stop at hub N or via a fourth snap ring (not shown) and in the second axial force direction via a fifth snap ring SR5. A transmission of axial force from the outer race L22 to the bearing shield LS is effected in the first axial force direction through a stop at the bearing shield LS and in the second axial force direction through a sixth snap ring SR6.

Figure 3:
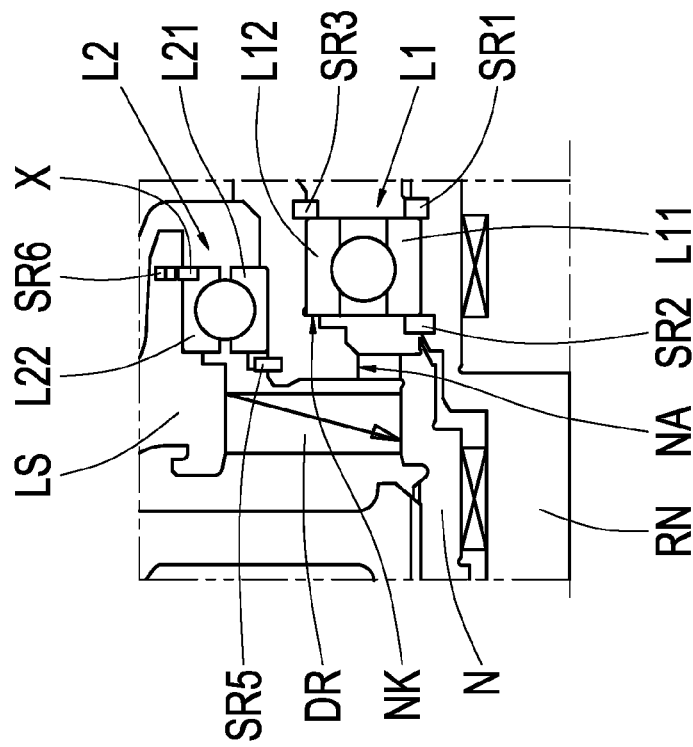

FIG. 3 shows a detailed view of the bearing arrangement of the hybrid drive module 1 according to a third embodiment example. In contrast to the embodiment according to FIG. 2, an added element X is now provided that holds the sixth snap ring SR6 in its spread apart position. The added element X is formed, for example, as a washer. During the assembly process, the added element X is displaced through the outer race L22 so that the sixth snap ring SR6 locks into the groove provided for it.

Figure 4:
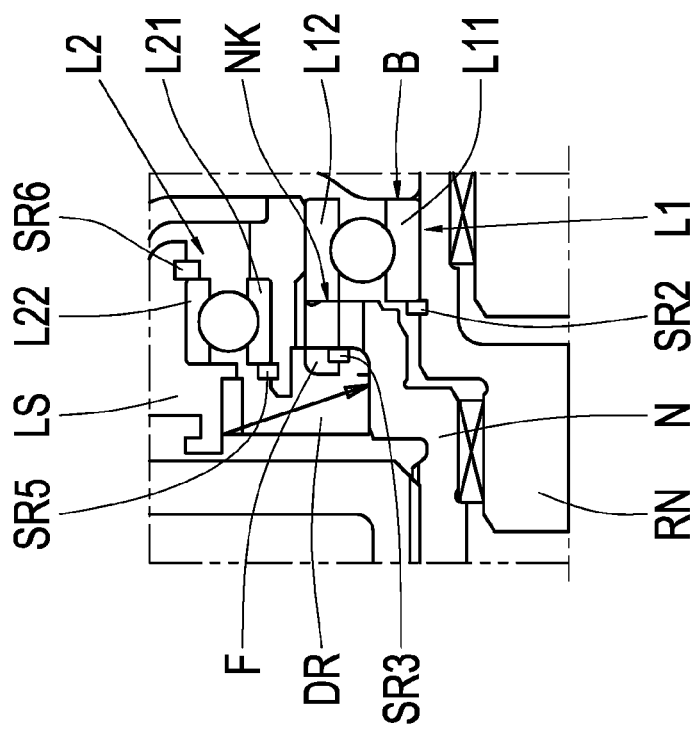

FIG. 4 shows a detailed view of the bearing arrangement of the hybrid drive module 1 according to the first embodiment example. In contrast to the embodiments according to FIG. 2 and FIG. 3, the arrangement of the third snap ring SR3 has been modified such that it is now arranged on the other side of the hub N than the first rolling element bearing L1. For the transmission of force between the outer race L12 and the hub N, a plurality of projections F which extend through apertures arranged in the hub N are provided at the outer race L12. The projections F can be an integral component part of the outer race L12 or can be connected thereto in a suitable manner. Accordingly, the third snap ring SR3 is accessible proceeding from the dry zone of the hybrid drive module 1 insofar as the radial shaft sealing ring DR has not been assembled.

Figure 5:
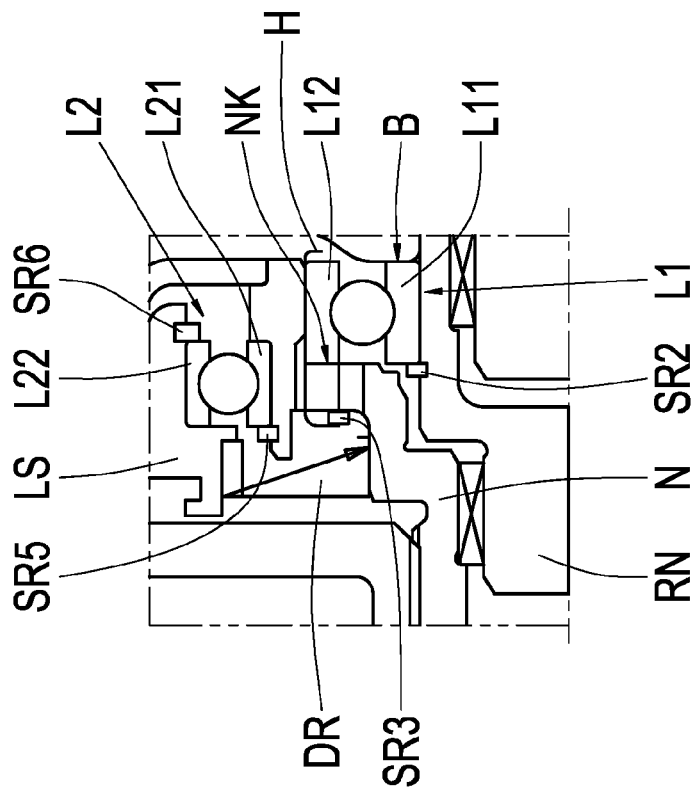

FIG. 5 shows a detailed view of the bearing arrangement of the hybrid drive module 1 according to a fourth embodiment example which substantially corresponds to the arrangement according to FIG. 1 and FIG. 4. A sleeve H which surrounds the outer race L12 and extends through the apertures arranged in the hub N is now provided instead of projections F. The sleeve H cooperates with the third snap ring SR3 for transmitting axial force between the hub N and the outer race L12. Also as a result of this solution, the third snap ring SR3 is accessible proceeding from the dry zone of the hybrid drive module 1.

Figure 6:
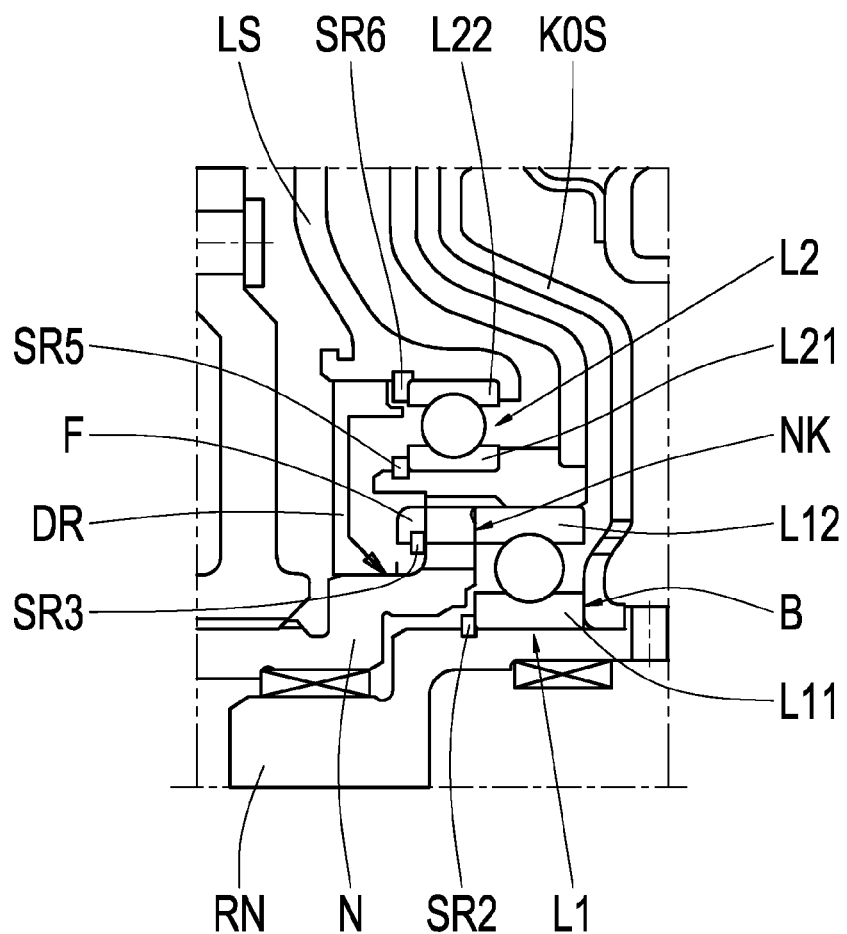

FIG. 6 shows a detailed view of the bearing arrangement of the hybrid drive module 1 according to a fifth embodiment example which substantially corresponds to that in FIG. 4. The transmission of axial force from the outer race L22 of the second rolling element bearing L2 to the bearing shield LS is now effected toward the right-hand side referring to the drawing via the sixth snap ring SR6 and toward the left-hand side referring to the drawing via a stop at the bearing shield LS. This facilitates the accessibility of the sixth snap ring S6.

Figure 7:
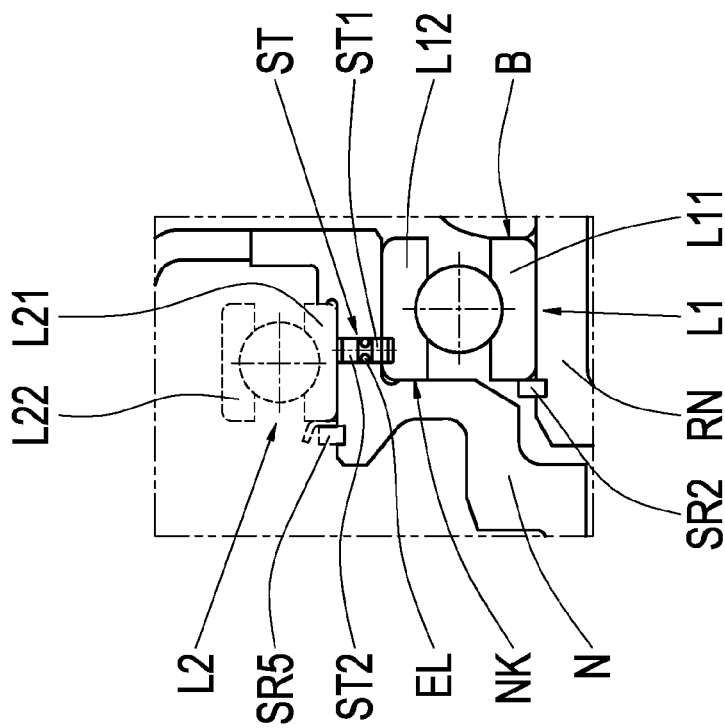

FIG. 7 shows a detailed view of the bearing arrangement of a hybrid drive module 1 according to a sixth embodiment example. In the present embodiment example, the outer race L12 is axially secured via a plurality of pin elements ST. To this end, three radial bore holes are preferably distributed along the circumference of the hub N. A pin element ST is arranged in each of these radial bore holes. The pin element ST has an elastic element EL arranged between two pin portions ST1, ST2. The radially inner pin portion ST1 cooperates in a positive engagement with a groove in the outer circumference of the outer race L12 to define the position of the second rolling element bearing L2 relative to the hub N. An arrangement with only one pin element ST is also conceivable.

Figure 8:
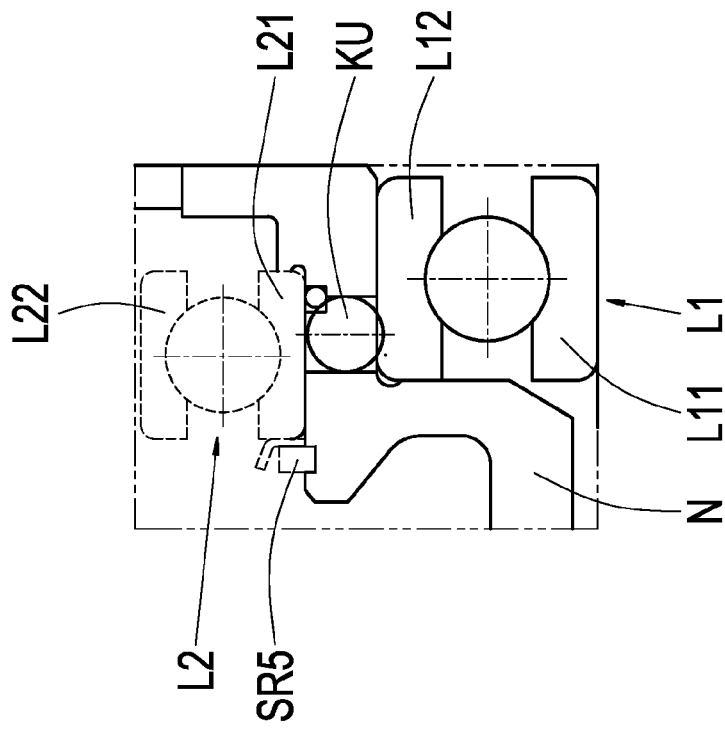

FIG. 8 shows a detailed view of the bearing arrangement of the hybrid drive module 1 according to a seventh embodiment example. The outer race L12 is now axially secured via a plurality of balls KU distributed along the circumference instead of with pin elements ST. The balls are arranged in corresponding radial bore holes of the hub N. The diameter of the balls KU is of a magnitude such that they cooperate with a notch at the outer circumference of the outer race L12 so that the position of the second rolling element bearing L2 is defined relative to the hub N. The balls KU are clamped in radial direction between the outer race L12 and the inner race L21. An O-ring prevents loss of the balls KU when the second rolling element bearing L2 has not yet been assembled. To this end, a groove which intersects the radial bore holes is provided at the outer circumference of the hub N. The O-ring can be inserted in this groove and accordingly reduces the outer opening cross section of the radial bore holes.

FIG. 9 shows a detailed view of the bearing arrangement of the hybrid drive module 1 according to an eighth embodiment example, which substantially corresponds to the embodiment example shown in FIG. 8. In order to improve the positive engagement between the balls KU and the outer race L12, two balls KU, KU2 are now provided in each radial bore hole. Elements for preventing the loss of balls KU, KU2 are carried out by a slit ring arranged at the radially outer opening of the radial bore hole. The ring can be made of steel or plastic. Alternatively, the balls KU, KU2 could be pressed into the radial bore hole so that separate loss prevention means could be dispensed with.

FIG. 10 shows a detailed view of the bearing arrangement of the hybrid drive module 1 according to a ninth embodiment form. The inner race L11 of the first rolling element bearing L1 is clamped relative to the rotor hub RN between the collar B and a retaining ring SRX. FIG. 11 shows the retaining ring SRX in cross section. The retaining ring SRX can be spread apart for assembly and disassembly through the aperture NA in the hub N.

It will be appreciated that individual embodiment examples can be combined. For example, the support of the outer race L22 of the second rolling element bearing referring to FIG. 6 could be used in all of the other embodiment examples.

Figure 12:
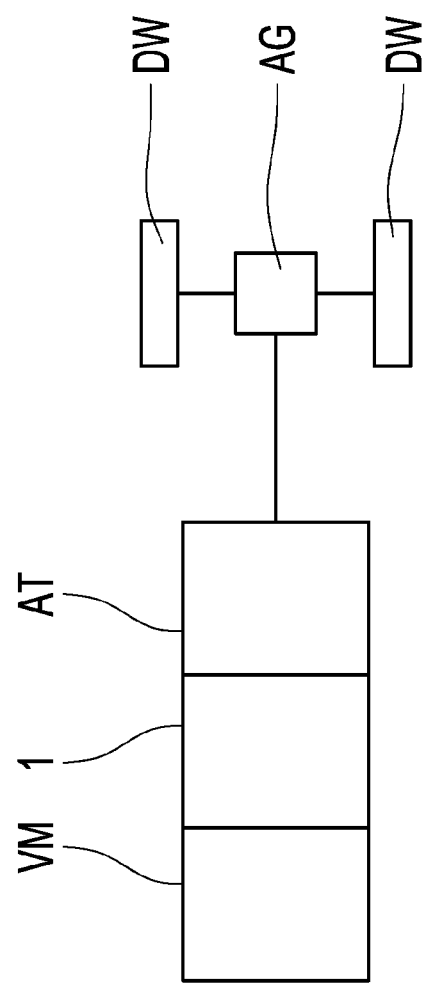
FIG. 12 and FIG. 13 are a motor vehicle powertrain.

FIG. 12 shows a powertrain of a motor vehicle. The powertrain has an internal combustion engine VM, the hybrid drive module 1 and a transmission AT. Hybrid drive module 1 and transmission AT are units which are separate from one another and have at least one interface via which the hybrid drive module 1 and the transmission AT are connectable to one another. A hydraulic supply of the hybrid drive module 1 is preferably carried out via hydraulics of the transmission AT. On the output side, the transmission AT is connected to a differential AG, for example, via a universal joint shaft. The power applied to an output shaft of the transmission AT is distributed to drive wheels DW of the motor vehicle by the differential AG.

Figure 13:
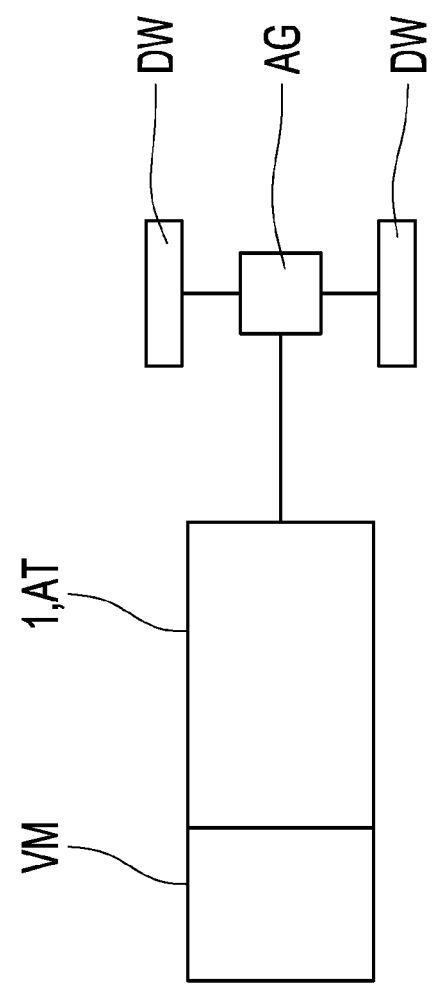

FIG. 13 shows a powertrain of a motor vehicle which substantially corresponds to the powertrain shown in FIG. 12. The hybrid drive module 1 and the transmission AT now form a common constructional unit. In other words, the hybrid drive module 1 is an integral component part of the transmission AT.

The powertrains shown in FIG. 12 and FIG. 13 are considered merely exemplary. Instead of the depicted construction with powertrain oriented longitudinal to the driving direction of the motor vehicle, a use of the invention in a powertrain oriented transverse to the driving direction is also conceivable. The differential AG can be integrated in the transmission G. The powertrain with the hybrid drive module 1 is also suitable for an all-wheel drive application.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed or described form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A hybrid drive module for a motor vehicle, comprising:
a housing;
a bearing shield connected to the housing;
a hub;
a single first rolling element bearing;
an electric machine, comprising:
  a rotatable rotor rotatably mounted at the hub via the single first rolling element bearing; and
  a stator which is fixed with respect to rotation relative to the housing; and
a clutch, comprising:
  a first half of the clutch is connected to the hub so as to be fixed with respect to rotation or elastic with respect to rotation relative to the hub; and
  a second half of the clutch is connected to the rotor so as to be fixed with respect to rotation or elastic with respect to rotation relative to the rotor; and
  a single second rolling element bearing via which the hub is rotatably mounted at the bearing shield, which is connected to the housing;
wherein a supporting of axial forces on both sides is carried out between the rotor and hub via the single first rolling element bearing and between the hub and bearing shield via the single second rolling element bearing,
wherein both respective axial faces of an inner and outer race of the single first rolling element bearing and an inner and outer race of the single second rolling element bearing are axially supported in their respective mounting locations,
wherein the outer race of the single first rolling element bearing is additionally axially secured relative to the hub by securing means arranged on a portion of the outer race of the single first rolling element arranged between the axial ends of the outer race of the single first rolling element,
wherein the single first rolling element bearing at least partially radially overlaps the single second rolling element bearing.

2. The hybrid drive module according to claim 1, wherein an inner race of the single first rolling element bearing is associated with the rotor, and an outer race of the single first rolling element bearing is associated with the hub.

3. The hybrid drive module according to claim 2, wherein a transmission of axial force from the rotor to the inner race of the single first rolling element bearing is carried out in a first axial force direction via an axial stop or a first snap ring and in a second axial force direction via a second snap ring or via a retaining ring.

4. The hybrid drive module according to claim 3, wherein at least one aperture is provided in the hub, which enables access to the second snap ring or to the retaining ring through the hub.

5. The hybrid drive module according to claim 3, wherein the axial stop is formed by an element of an actuation device of the clutch that is connected to the rotor so as to be fixed with respect to rotation relative to the rotor.

6. The hybrid drive module according to claim 2, wherein a transmission of axial force from the outer race of the single first rolling element bearing to the hub is carried out in a first axial force direction via a contact surface between the hub and outer race of the single first rolling element bearing and in a second axial force direction via a third snap ring.

7. The hybrid drive module according to claim 6, wherein the contact surface is arranged axially between the outer race of the single first rolling element bearing and the third snap ring.

8. The hybrid drive module according to claim 6, wherein axially protruding projections are arranged at the outer race of the single first rolling element bearing, which projections extend through apertures arranged in the hub, wherein the third snap ring cooperates with the projections.

9. The hybrid drive module according to claim 6, wherein a sleeve is provided that surrounds the outer race of the single first rolling element bearing and projects through apertures provided in the hub, wherein the third snap ring cooperates with the sleeve.

10. The hybrid drive module according to claim 2, wherein the outer race of the single first rolling element bearing is axially secured relative to the hub by at least one pin element which is arranged in a radial bore hole of the hub and engages in a groove of the outer race.

11. The hybrid drive module according to claim 10, wherein the at least one pin element comprises an elastic element arranged between two pin portions of the at least one pin element.

12. The hybrid drive module according to claim 2, wherein the outer race of the single first rolling element bearing is axially secured relative to the hub by at least one ball arranged in a radial bore hole of the hub and cooperates in positive engagement with the outer race.

13. The hybrid drive module according to claim 12, wherein the at least one ball is secured against radially falling out by an O-ring.

14. The hybrid drive module according to claim 12, wherein a further ball is provided in addition to the at least one ball, which further ball is arranged in a radial bore hole radially outside of the at least one ball.

15. The hybrid drive module according to claim 1, wherein an inner race of the single second rolling element bearing is associated with the hub, and an outer race of the single second rolling element bearing is associated with the bearing shield.

16. The hybrid drive module according to claim 15, wherein a transmission of axial force from the hub to the inner race of the single second rolling element bearing in a first axial force direction is carried out via a stop at the hub or via a fourth snap ring, and the transmission of axial force is carried out in a second axial force direction via a fifth snap ring.

17. The hybrid drive module according to claim 16, wherein the transmission of axial force from the outer race of the single second rolling element bearing to the bearing shield is carried out in a first axial force direction via a stop at the bearing shield and in a second axial force direction via a sixth snap ring.

18. The hybrid drive module according claim 1, wherein a radial shaft sealing ring is provided between the bearing shield and the hub for sealing a radial gap.

19. The hybrid drive module according to claim 1, wherein the clutch is formed as a multiple plate clutch, wherein the first half of the clutch is associated with an inner plate carrier of the clutch.

20. The hybrid drive module according to claim 1, wherein the hybrid drive module is either an integral component part of a motor vehicle transmission or is formed as an independent unit with at least one interface to a motor vehicle transmission.

21. A powertrain for a motor vehicle, comprising:
a hybrid drive module, comprising:
    a housing;
    a bearing shield connected to the housing;
    a hub;
    a single first rolling element bearing;
    an electric machine, comprising:
        a rotatable rotor rotatably mounted at the hub via the single first rolling element bearing; and
        a stator which is fixed with respect to rotation relative to the housing; and
    a clutch, comprising:
        a first half of the clutch is connected to the hub so as to be fixed with respect to rotation or elastic with respect to rotation relative to the hub; and
        a second half of the clutch is connected to the rotor so as to be fixed with respect to rotation or elastic with respect to rotation relative to the rotor; and
    a single second rolling element bearing via which the hub is rotatably mounted at the bearing shield, which is connected to the housing;
wherein a supporting of axial forces on both sides is carried out between the rotor and hub via the single first rolling element bearing and between the hub and bearing shield via the single second rolling element bearing,
wherein both respective axial faces of an inner and outer race of the single first rolling element bearing and an inner and outer race of the single second rolling element bearing are axially supported in their respective mounting locations,
wherein the outer race of the single first rolling element bearing is additionally axially secured relative to the hub by securing means arranged on a portion of the outer race of the single first rolling element arranged between the axial ends of the outer race of the single first rolling element,
wherein the single first rolling element bearing at least partially radially overlaps the single second rolling element bearing.

* * * * *